United States Patent
Taylor et al.

(10) Patent No.: US 6,935,357 B2
(45) Date of Patent: Aug. 30, 2005

(54) FLUID SUPPLY FAILURE PROTECTION VALVE

(75) Inventors: Gareth Peter Taylor, Indian Trail, NC (US); Jason Daniel Scharf, Charlotte, NC (US)

(73) Assignee: Conbraco Industries, Inc., Matthews, NC (US)

( * ) Notice: Subject to any disclaimer, the term of this patent is extended or adjusted under 35 U.S.C. 154(b) by 0 days.

(21) Appl. No.: 11/070,980

(22) Filed: Mar. 3, 2005

(65) Prior Publication Data

US 2005/0145275 A1 Jul. 7, 2005

Related U.S. Application Data

(62) Division of application No. 10/736,382, filed on Dec. 15, 2003.

(51) Int. Cl.[7] .............................................. G05D 11/16
(52) U.S. Cl. ...................... 137/110; 137/113; 137/114
(58) Field of Search ......................... 137/98, 110, 111, 137/113, 114

(56) References Cited

U.S. PATENT DOCUMENTS

| | | | | |
|---|---|---|---|---|
| 3,642,021 A | * | 2/1972 | Muller et al. | 137/114 |
| 4,473,088 A | * | 9/1984 | Dotter | 137/98 |
| 5,161,737 A | * | 11/1992 | Olmsted et al. | 137/114 |
| 6,263,899 B1 | * | 7/2001 | Zindler | 137/98 |

* cited by examiner

*Primary Examiner*—Stephen M. Hepperle
(74) *Attorney, Agent, or Firm*—Adams Evans P.A.

(57) ABSTRACT

A water supply failure protection valve is connected to hot and cold water supplies. The failure protection valve is responsive to the loss of cold water supply pressure to shut off all water flow. The failure protection valve is responsive to the loss of hot water supply pressure to permit cold water flow through both a cold water flow path and a hot water flow path so as to ensure a substantial flow of water to a downstream fixture. The supply failure protection valve may be integrated with a thermal mixing valve to provide water at a preselected temperature.

15 Claims, 4 Drawing Sheets

FLUID SUPPLY FAILURE PROTECTION VALVE

This application is a divisional application of U.S. patent application Ser. No. 10/736,382, filed Dec. 15, 2003, pending.

BACKGROUND OF THE INVENTION

This invention relates generally to a fluid supply failure protection valve and more particularly to a protection valve which safely accommodates failure of either a hot or a cold water supply to a tempering valve.

Tempered fluid mixing systems are used in a variety of commercial and/or industrial applications, for example, in emergency fixtures such as drench shower stations and/or safety eyewash stations, which are used to rinse hazardous chemicals from a person's skin and clothing or to extinguish burning clothing on a person. A typical system includes a thermostatic mixing valve or tempering valve which automatically blends hot and cold water supply streams to produce a mixed, tempered water output stream having a selected temperature, for example about 27 degrees C. (80 degrees F.).

A known problem with such tempered water mixing systems is that either the hot or cold water supplies may fail. If the cold water supply fails, the mixing valve will supply potentially scalding hot water to the user, causing the risk of burns and further injury. If the hot water supply fails, it is possible to continue using the emergency fixture. However, in this case, only cold water will be supplied to the thermostatic mixing valve, which will cause it to restrict the water flow to a level that is inadequate for proper rinsing or fire extinguishing. Attempts have been made in the prior art to provide for the cut-off of hot water flow in case of a cold water failure, and to provide a bypass flow of cold water should the hot water supply fail. However, these prior art systems require either that the tempering valve be replaced with a tempering valve of an entirely different design, for both tempering the water and accommodating the supply failure, or they require that a separate cold water bypass circuit be plumbed into the system. Accordingly, there is a need for fluid supply failure protection valve which protects a fluid system from failure of both hot and cold water supplies, and which may be integrated into existing systems.

BRIEF SUMMARY OF THE INVENTION

Therefore, it is an object of the invention to provide a fluid supply failure protection valve which provides an adequate flow under all possible conditions.

It is another object of the invention to provide a fluid supply failure protection valve which may be simply retrofitted into existing tempered fluid supply systems.

It is another object of the invention to provide a fluid supply failure protection valve which is responsive to a loss of cold fluid supply pressure to shut off all fluid flow.

It is another object of the invention to provide a fluid supply failure protection valve which is responsive to a loss of hot fluid supply pressure to provide a substantial flow of cold fluid through both hot and cold fluid flow paths.

These and other objects of the present invention are achieved in the preferred embodiments disclosed below by providing a supply failure protection valve which includes a housing defining a first fluid inlet in fluid communication with a spaced-apart first fluid port, and a second fluid inlet in fluid communication with a spaced-apart second fluid port. First valve means permit flow communication between the first fluid inlet and the first fluid port in the presence of fluid pressure in the second fluid inlet, and prevent communication between the first fluid inlet and the first fluid port in response to an absence of fluid pressure in the second fluid inlet. Second valve means for preventing the flow of fluid from the second fluid inlet to the first fluid port in the presence of fluid pressure in the first fluid inlet, and for permitting flow communication from the second fluid inlet to both of the first and second fluid ports in response to the absence of supply pressure in the first fluid inlet.

In another embodiment of the present invention, the first valve means includes a hollow, open-ended valve sleeve disposed in a bore formed in the housing, the bore being in fluid communication with the first and second fluid inlets. The valve sleeve is movable between a first position wherein flow from the first fluid inlet to the first fluid port is permitted, and a second position wherein flow from the first fluid inlet to the first fluid port is blocked.

In another embodiment of the present invention, the second valve means includes a piston disposed inside the valve sleeve. The piston is movable between a closed position wherein flow from the second fluid inlet to the first fluid port is blocked, and an open position wherein flow from the first fluid inlet to the second fluid port is permitted.

In another embodiment of the present invention, the supply failure protection valve includes first biasing means for urging the valve sleeve towards the first position.

In another embodiment of the present invention, the supply failure protection valve includes second biasing means for urging the piston towards the closed position.

In another embodiment of the present invention, the supply failure protection valve includes a first check valve disposed in the first fluid inlet. The first check valve allows flow from the first fluid inlet to the bore but prevents flow in the opposite direction.

In another embodiment of the present invention, the supply failure protection valve includes a second check valve disposed in the second fluid port. The second check valve allows flow from the bore to the second fluid port but prevents flow in the opposite direction.

In another embodiment of the present invention, a fluid supply failure protection valve includes: a housing having a bore with upper and lower portions formed therein; a cold fluid inlet for receiving a fluid at a first temperature, and a hot fluid inlet for receiving a fluid at a second temperature greater than the first temperature. The hot fluid inlet has a hot fluid check valve disposed therein which allows flow from the hot fluid inlet to the bore but prevents flow in the opposite direction. A hot fluid port is spaced-apart from the hot fluid inlet and connected in flow communication with the hot fluid inlet. A cold fluid port is spaced-apart from the cold fluid inlet and connected in flow communication with the cold fluid inlet. A hollow sleeve disposed in the bore, the sleeve having open upper and lower ends, and a plurality of side ports formed through the lateral surfaces thereof, the side ports forming a transverse flow path through the sleeve. The sleeve is movable between a first position which permits flow communication between the hot fluid inlet and the hot fluid port, and a second position in which flow communication between the hot fluid inlet and the hot fluid port is blocked;

an upper biasing means is disposed in the bore above the sleeve, so as to urge the sleeve towards the first position. A piston is disposed in the sleeve, and is movable between a closed position in which the flow of fluid from the cold fluid inlet to the hot fluid port is blocked, and an open position in which flow communication is permitted from the cold fluid inlet to both of the hot and cold fluid ports. A lower biasing means is disposed in the sleeve between the lower end of the sleeve and the lower face of the piston, and urges the piston towards the open position.

The sleeve moves to the first position in the presence of fluid pressure in the cold fluid inlet, and moves to the second position in absence of fluid pressure in the cold fluid inlet, and the piston moves to the closed position in the presence of fluid pressure in the hot fluid inlet, and moves to the open position in response to the absence of fluid pressure in the hot fluid inlet.

In another embodiment of the present invention, the supply failure protection valve includes a cold fluid check valve disposed in the cold fluid port which allows flow from the bore to the cold fluid port but prevents flow in the opposite direction.

In another embodiment of the present invention, the supply failure protection valve has an upper face carrying an upper seal, a lower face carrying a lower seal, and a narrow central member connecting the upper and lower faces.

In another embodiment of the present invention, the upper biasing means includes a coil spring.

In another embodiment of the present invention, the lower biasing means includes a coil spring.

In another embodiment of the present invention, the upper biasing means comprises a surface area at the upper end of the sleeve which is greater than an opposing surface area at the lower end of the sleeve.

In another embodiment of the present invention, the supply failure protection valve includes a bypass passage providing flow communication between the hot fluid inlet upstream of the hot fluid check valve and the lower portion of the bore.

In another embodiment of the present invention, a valve assembly for receiving hot and cold water streams and providing a mixed output stream at a preselected temperature includes a tempering valve, having: a housing defining a cold fluid port, a hot fluid port, an outlet port, a cold fluid inlet for receiving a fluid at a first temperature, a hot fluid inlet for receiving a fluid at a second temperature greater than the first temperature, a first bore and a second bore having upper and lower portions, wherein the hot fluid inlet has a hot fluid check valve disposed therein which allows flow from the hot fluid inlet to the second bore but prevents flow in the opposite direction. A cylinder is disposed in the first bore in fluid communication with the cold fluid port, the hot fluid port, and the outlet port, the cylinder having upper and lower sealing edges and a cylinder seal which prevents fluid communication between the hot and cold water ports.

a temperature-responsive element is connected to the cylinder and is operative to move the cylinder so as to control the relative proportions of flow from the hot and cold water ports to the outlet port for maintaining a preselected fluid temperature. A fluid supply failure protection valve includes: a hollow sleeve disposed in the second bore, the sleeve having open upper and lower ends, and a plurality of side ports formed through the lateral surfaces thereof, the side ports forming a transverse flow path through the sleeve, the sleeve movable between a first position which permits flow communication between the hot fluid inlet and the hot fluid port, and a second position in which flow communication between the hot fluid inlet and the hot fluid port is blocked.

An upper biasing means is disposed in the bore above the sleeve, so as to urge the sleeve towards the first position. A piston is disposed in the sleeve, the piston movable between a closed position in which the flow of fluid from the cold fluid inlet to the hot fluid port is blocked and an open position in which flow communication is permitted from the cold fluid inlet to both of the hot and cold fluid ports. A lower biasing means is disposed in the sleeve between the lower end of the sleeve and the lower face of the piston, the spring urging the piston towards the open position.

the sleeve moves to the first position in the presence of fluid pressure in the cold fluid inlet, and moves to the second position in absence of fluid pressure in the cold fluid inlet, and the piston moves to the closed position in the presence of fluid pressure in the hot fluid inlet, and moves to the open position in response to the absence of fluid pressure in the hot fluid inlet.

In another embodiment of the present invention, the valve assembly includes a cold fluid check valve disposed in the cold fluid port which allows flow from the bore to the cold fluid port but prevents flow in the opposite direction.

In another embodiment of the present invention, the valve assembly includes a movable adjusting stem disposed in the housing which contacts the temperature-responsive element at a preselected position.

In another embodiment of the present invention, the piston has an upper face carrying an upper seal, a lower face carrying a lower seal, and a narrow central member connecting the upper and lower faces.

The present invention and its advantages over the prior art will become apparent upon reading the following detailed description and the appended claims with reference to the accompanying drawings.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
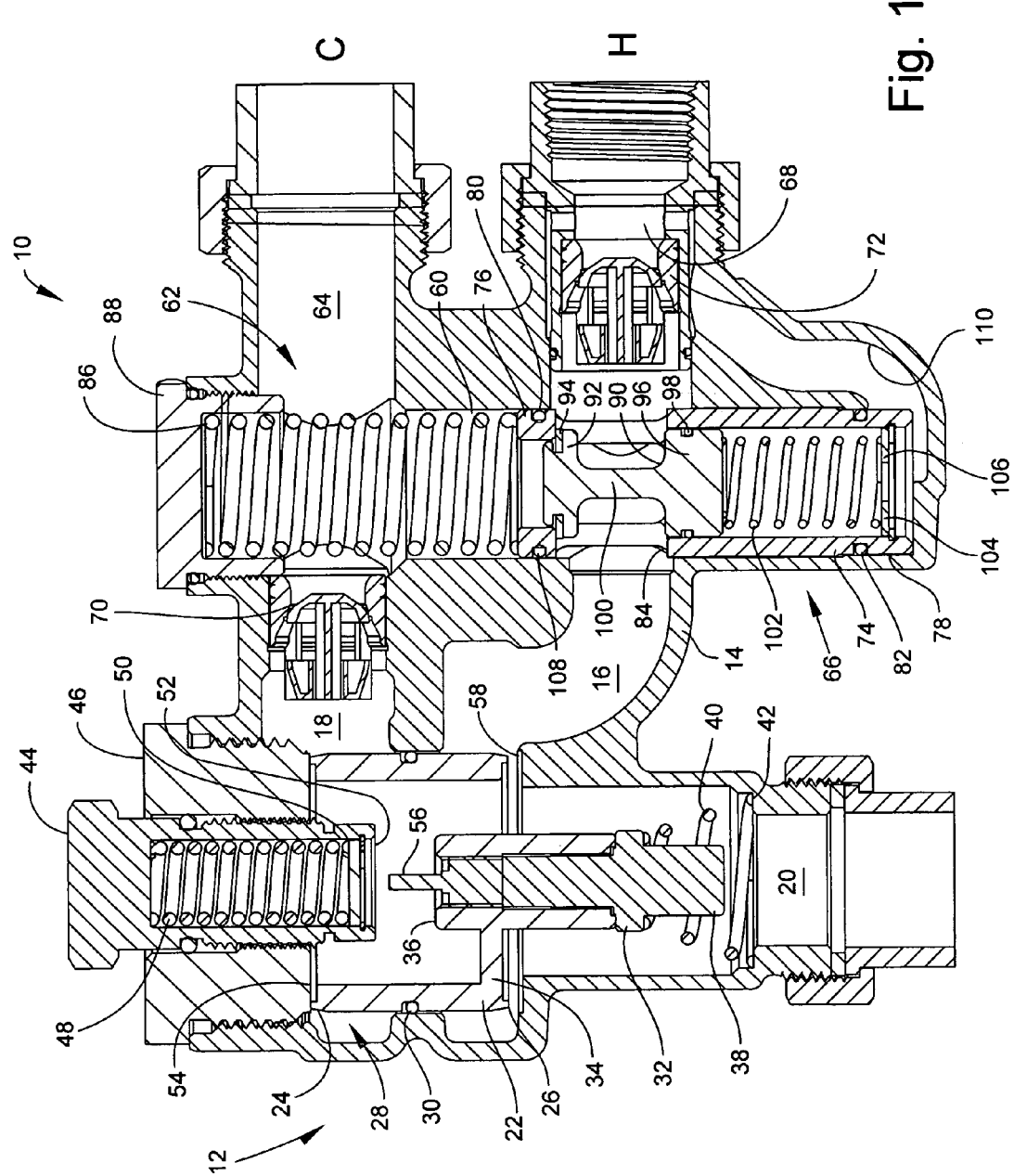
FIG. 1 is a cross-sectional view of an exemplary tempering valve including a supply failure protection valve constructed in accordance with the present invention, during a normal operating condition.
Figure 2:
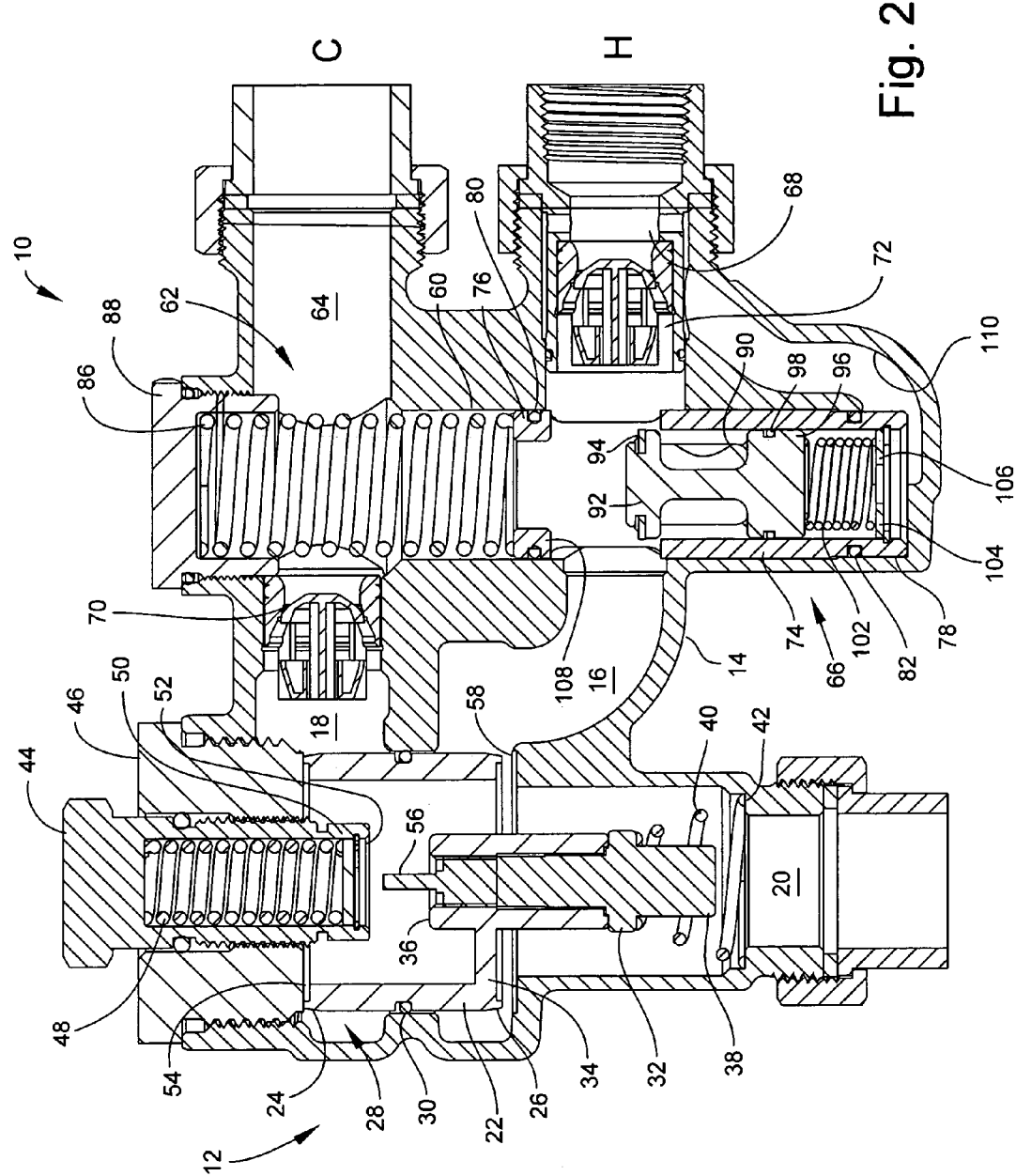
FIG. 2 is a view of the valve of FIG. 1, during a condition in which the hot fluid supply has failed.
Figure 3:
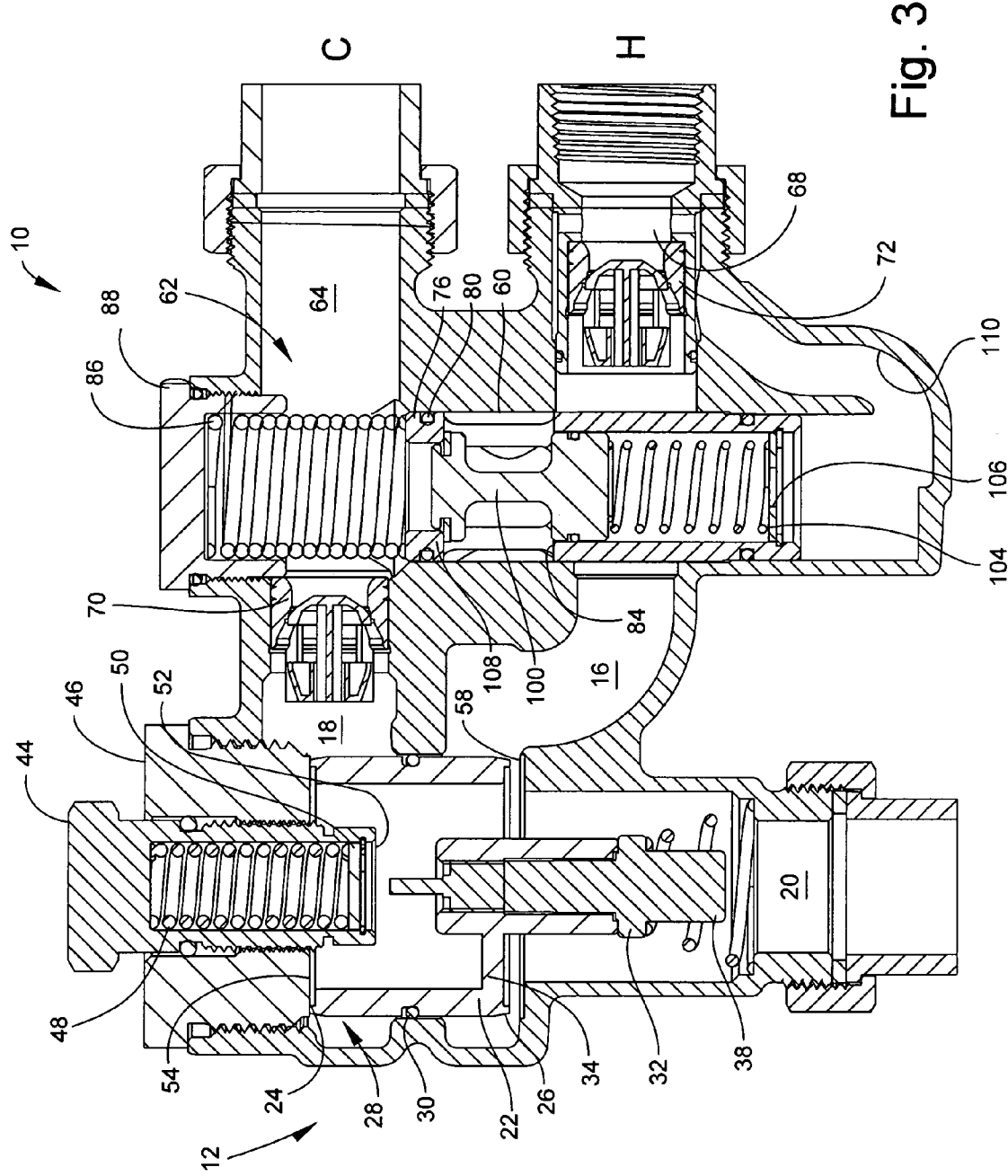
FIG. 3 is a view of the valve of FIG. 1, during a condition in which the cold fluid supply has failed.

Referring to the drawings wherein identical reference numerals denote the same elements throughout the various views, FIG. 1 illustrates an exemplary fluid supply failure protection valve 10 constructed in accordance with the present invention. It should be noted that the present invention is equally applicable to systems which handle fluids other than water, and therefore the terms "water" and "fluid" are used interchangeably herein when describing the invention. In this embodiment, the supply failure protection valve 10 is combined with a known type of tempering valve 12 in a common housing 14. The tempering valve 12 includes a hot fluid port 16, a cold fluid port 18, and an outlet port 20. A hollow cylinder 22 with circumferential upper and lower sealing edges 24 and 26 is disposed in a first bore 28 in fluid communication with the hot water, cold water, and outlet ports 16, 18, and 20. A cylinder seal 30 prevents leakage between the hot and cold water ports 16 and 18. A temperature-responsive element 32 is located inside the cylinder 22 and connected to the cylinder 22 by a circumferential array of struts 34. For illustrative clarity only one such strut 34 is shown in FIGS. 1, 2, and 3. In this example the temperature-responsive element 32 is a known type of thermomechanical unit such as a sealed, wax-filled capsule having upper and lower ends 36 and 38. However, any other type of device capable of moving the cylinder 22 in response to a temperature change may be used. A return spring 40 is disposed between the lower end 38 of the temperature-responsive element 32 and a seat 42 located at the bottom of the first bore 28. A threaded adjusting stem 44 is mounted in the housing 14, for example in a removable adjuster cap 46. The adjusting stem 44 is hollow and has an overtravel spring 48 disposed therein. The overtravel spring 48 is held in by a flat disk 50 and a retaining ring 52 at its lower end.

The tempering valve 12 operates as follows: Water flows into the tempering valve 12 through both the hot and cold ports 16 and 18. It flows past the upper and lower sealing edges 24 and 26 of the cylinder 22, past the temperature-responsive element 32, and through the outlet port 20. At temperatures below a selected metering range, the cylinder 22 is urged upward by the return spring 40 so that the upper sealing edge 24 contacts an upper sealing surface 54. Therefore, most of the flow of water will be from the hot fluid port 16, past the lower sealing edge 26, and into the outlet port 20. As the temperature increases, the temperature-responsive element 32 expands upward until a pin 56 protruding from the upper end 36 of the temperature-responsive element 32 contacts the disk 50. Further expansion of the temperature-responsive element 32 causes it to displace the cylinder 22 downward, opening a flow path between the upper sealing edge 24 and the upper sealing surface 54, simultaneously reducing the size of the flow path beneath the lower sealing edge 26. As the temperature further increases, the cylinder is finally moved all the way to its lowest position in which the lower sealing edge 26 contacts a lower sealing surface 58, thus cutting off all hot water flow. The temperature of the mixed water can be selected by moving the adjusting screw 44 up or down, which changes the distance the pin 56 must move before it contacts the disk 50. Under normal operation, the disk 50 does not move. However, if the tempering valve 12 should be heated beyond its intended operating range, the excess force generated by the temperature-responsive element 32 will displace the disk 50 and compress the overtravel spring 48. This prevents damage to the temperature-responsive element 32.

The failure protection valve 10 includes a second bore 60 formed in the housing 14. The upper portion 62 of the second bore 60 is in fluid communication with the cold fluid port 18 and a cold fluid inlet 64, while the lower portion 66 of the second bore 60 is in fluid communication with the hot fluid port 16 and a hot fluid inlet 68. A cold fluid check valve 70 is disposed in the cold fluid port 18 and allows flow to pass from the second bore 60 to the cold fluid port 18, but prevents flow in the opposite direction. A hot fluid check valve 72 is disposed in the hot fluid inlet 68 and allows flow to pass from the hot fluid inlet 68 to the second bore 60 but prevents flow in the opposite direction.

A cylindrical, hollow valve sleeve 74 having open upper and lower ends 76 and 78 slides in the second bore 60, sealed by first and second sleeve seals 80 and 82, such as O-rings of a known type. A circumferential array of side ports 84 are formed in the lateral surfaces of the valve sleeve 74 near its upper end 76 and define a transverse flow path through the valve sleeve 74. The valve sleeve 74 is biased downward by an upper bias means 86, which in this case is shown as a spring which is retained by a threaded spring cap 88. The upper bias means 86 may also take the form of an unbalanced surface area incorporated into the sleeve 74, as described more fully below with respect to the alternative embodiment shown in FIG. 4. A piston 90 is disposed in the interior of the valve sleeve 74. The piston 90 has an upper face 92 with an upper seal 94, and a lower face 96 with a lower seal 98. The upper and lower faces 92 and 96 are connected by a narrow central member 100. A lower bias spring 102 is disposed in the valve sleeve 74 and extends between the lower face 96 of the piston 90 and a retainer 104 having an opening 106 formed therein. The piston 90 is urged upwards by the lower bias spring 102 so that the upper seal 94 seals against a ledge 108 in the valve sleeve 74.

FIG. 1 depicts the operation of the supply failure protection valve 10 during normal operation, that is, when both the hot and cold water supplies (denoted "H" and "C" respectively in FIG. 1) are operating. Cold water from the cold water supply C passes through the cold fluid inlet 64, passes through the second bore 60, into the cold fluid port 18, thorough the cold fluid check valve 70, and finally into the tempering valve 12. Hot water from the hot water supply H passes through the hot fluid inlet 68. Some of the hot water flow passes through the hot fluid check valve 72, through the side ports 84, around the central member 100 of the piston 90, through the hot fluid port 16, and into the tempering valve 12. Optionally, some of the hot water flow from the hot fluid inlet 68 is diverted, before it passes through the hot fluid check valve 72, into a bypass passage 110. This bypass flow acts on the bottom end 78 of the valve sleeve 74 and on the lower face 96 of the piston 90. Alternatively, if the bypass passage 110 is not used, a flow path from the hot water inlet 68 to the bottom end 78 of the valve sleeve 74 and the lower face 96 of the piston 90 may be created by eliminating the lower seal 98 and the second sleeve seal 82. In either arrangement, because the supply pressures of the hot and cold water are approximately equal, the pressure of the hot water plus the preload of the lower bias spring 102 will keep the piston 90 sealed in its upper (or closed) position and prevent the leakage of cold water into the hot water flow path, while the pressure of the cold water plus the load of the upper bias means 86 will keep the sleeve 74 seated in its lower position, where it permits hot water to flow from the hot fluid inlet 68 to the hot fluid port 16.

FIG. 2 shows the operation of the supply failure protection valve 10 in a condition where the hot water supply H has failed. In the absence of the supply failure protection valve 10, tempering valve 12 would still be supplied with cold water through the normal cold water flowpath when the hot water supply fails. However, the cold water would be substantially below the temperature set point of the tempering valve 12, and this would cause the tempering valve to greatly restrict the flow of cold water, to a level insufficient to provide adequate flow for a downstream fixture.

In contrast, in the supply failure protection valve 10, when the hot water supply H fails, the pressure on the lower face 96 of the piston 90 is relieved. The pressure on the upper face 92 of the piston 90 is sufficient to compress the lower bias spring 102 and push the piston 90 down to an open position so that the upper seal 94 is unseated and a flowpath is open from the cold fluid inlet 64, downwards through the second bore 60, and through the hot fluid port 16 into the tempering valve 12. If the bypass passage 110 is present, it provides a flowpath from the interior of the valve sleeve 74 to the hot fluid inlet 68 (now at zero pressure) upstream of the hot fluid check valve 72. This allows any residual hot water which may be contained in the lower end 78 of the valve sleeve 74 to be expelled so the piston 90 can move down as intended. In the absence of the bypass passage 110, the lower seal 98 and the second sleeve seal 82 may be eliminated as described above, which allows any residual hot water to simply flow out between the sleeve 74 and the second bore 60, in turn permitting the piston 90 to move down.

In this position, cold water flows to the tempering valve 12 through both the hot fluid port 16 and the cold fluid port 18. The hot fluid check valve 72 prevents cold water from backing up into the hot water inlet 68. Thus, no matter what the position of the tempering valve cylinder 22, an adequate flow of cold water will flow out of the outlet port 20.

FIG. 3 shows the operation of the supply failure protection valve 10 in a condition where the cold water supply C has failed. In this case, the pressure on the upper face 92 of the piston 90 and the upper end 76 of the valve sleeve 74 falls to zero. The hot water pressure acting on the lower face 96 of the piston 90 and the lower end 78 of the valve sleeve 74 will force the valve sleeve 74 upward, overcoming the upper bias means 86. In this position, the side ports 84 are no longer exposed, and the valve sleeve 74 blocks off flow from the hot fluid inlet 68 to the hot fluid port 16. The cold fluid check valve 70 keeps any residual hot water pressure from backing up through the cold water port into the cold water supply C before the hot water flow is fully shut off. In this position, no water can flow through the tempering valve 12. Therefore, any chance of scalding is prevented.

Figure 4:
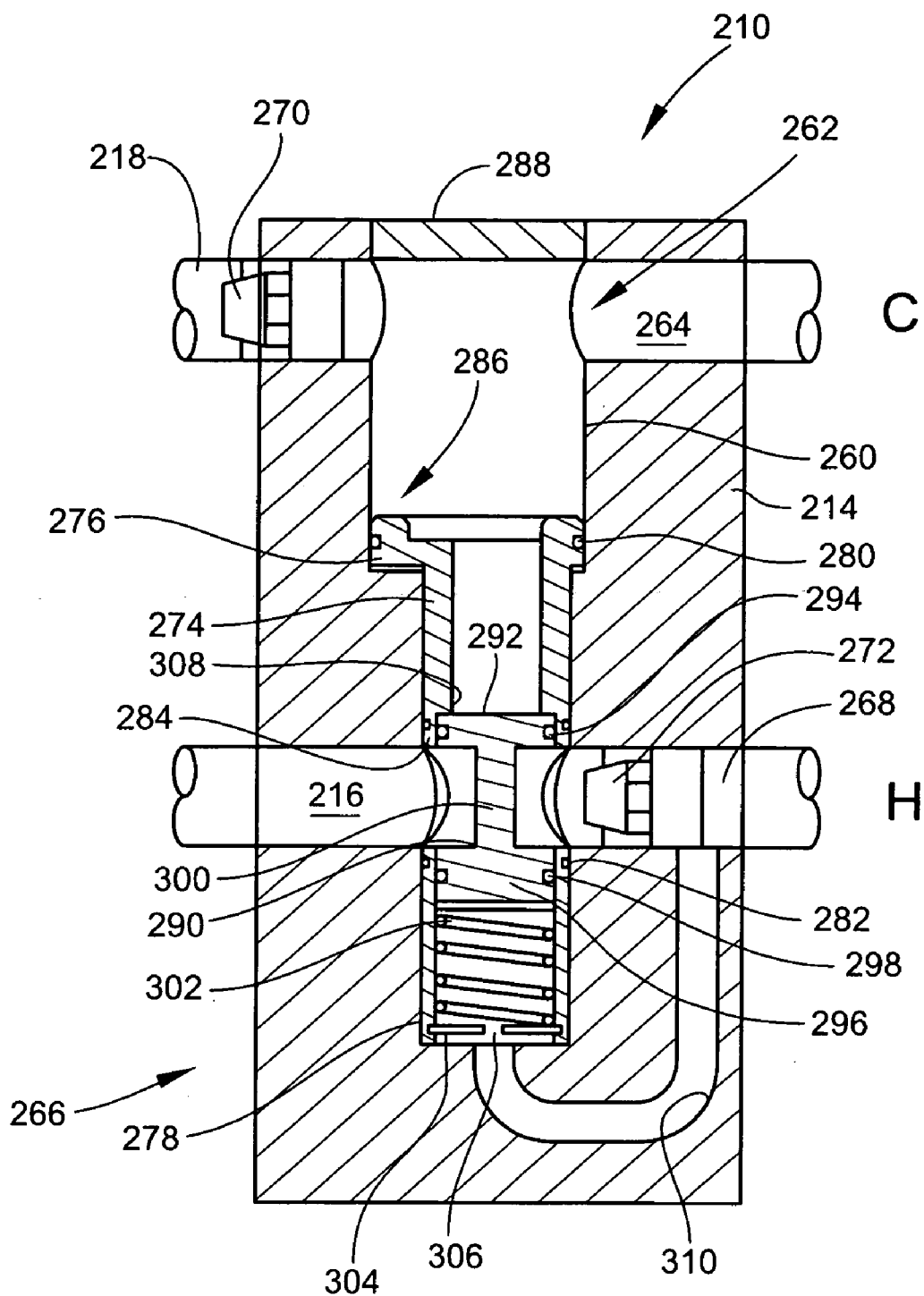
FIG. 4 is a cross-sectional view of an alternative embodiment of the supply failure protection valve.

FIG. 4 shows an alternative embodiment 210 of the supply failure protection valve. The supply failure protection valve 210 is substantially similar to the supply failure protection valve 10 described above. It differs in that the supply failure protection valve 210 is contained in its own individual housing 214, and is not combined with a tempering valve. A central bore 260 is formed in the housing 214. The upper portion 262 of the central bore 260 is in fluid communication with a cold fluid port 218 and a cold fluid inlet 264, and is closed off by a cap 288, while the lower portion 266 of the central bore 260 is in fluid communication with a hot fluid port 216 and a hot fluid inlet 268. A cold fluid check valve 270 is disposed in the cold fluid port 218 and allows flow to pass from the central bore 260 to the cold fluid port 218, but prevents flow in the opposite direction. A hot fluid check valve 272 is disposed in the hot fluid inlet 268 and allows flow to pass from the hot fluid inlet 268 to the central bore 260 but prevents flow in the opposite direction.

A hollow cylindrical valve sleeve 274 having open upper and lower ends 276 and 278 slides in the central bore 260, sealed by upper and lower sleeve seals 280 and 282, such as the illustrated O-rings. A plurality of side ports 284 are formed in the lateral surfaces of the valve sleeve 274 near its center. The valve sleeve 274 is biased downward by upper bias means 286. In the illustrated embodiment, the upper bias means are implemented by providing an increased surface area at the upper end 276 of the sleeve 274 relative to the opposing surface area at the lower end 278 of the sleeve 274. This ensures that here is a net downward force on the sleeve 274 when the hot and cold water supplies are at the same pressure. A spring such as that illustrated in FIG. 1 (not shown in FIG. 4) could also be used to provide an upper biasing means 286. A piston 290 is disposed in the interior of the valve sleeve 274. The piston 290 has an upper face 292 with an upper seal 294, and a lower face 296 with a lower seal 298, connected by a narrow central member 300. A lower bias spring 302 is disposed in the valve sleeve 274 and extends between the lower face 296 of the piston 290 and a retainer 304 having an opening 306 formed therein. The piston 290 is urged upwards by the lower bias spring 302 so that the upper seal 294 seals against a ledge 308 in the valve sleeve 274. A bypass passage 310 may be used to connect the lower portion 266 of the bore 260 to the hot fluid inlet 268 upstream of the hot fluid check valve 272. Alternatively, if the bypass passage 310 is not present, the lower seal 298 and the lower sleeve seal 282 may be eliminated to provide a flow path between the hot fluid inlet 268 and the lower portion of the bore 266.

The operation of the supply failure protection valve 210 is substantially the same as that of the supply failure protection valve 10 described above. It is installed into a water supply system by connecting the hot and cold fluid inlets 268 and 264 to hot and cold water supplies "H" and "C" respectively. The hot and cold water ports 216 and 218 are then connected to the hot and cold water inlets of a tempering valve (not shown) such as that described above. Thus, it may be retrofitted into an existing system to provide protection in the event either supply fails. Alternatively, the supply failure protection valve 210 may by connected to a system having a manual mixing valve, or separate hot and cold water faucets.

The foregoing has described a water supply failure protection valve. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A fluid supply failure protection valve, comprising:
   a housing defining a first fluid inlet in fluid communication with a spaced-apart first fluid port, and a second fluid inlet in fluid communication with a spaced-apart second fluid port;
   first valve means for permitting flow communication between said first fluid inlet and said first fluid port in the presence of fluid pressure in said second fluid inlet, and for preventing communication between said first fluid inlet and said first fluid port in response to an absence of fluid pressure in said second fluid inlet; and
   second valve means for preventing the flow of fluid from said second fluid inlet to said first fluid port in the presence of fluid pressure in said first fluid inlet, and for permitting flow communication from said second fluid inlet to both of said first and second fluid ports in response to the absence of supply pressure in said first fluid inlet.

2. The supply failure protection valve of claim 1 wherein said first valve means includes a hollow, open-ended valve sleeve disposed in a bore formed in said housing, said bore being in fluid communication with said first and second fluid inlets, said valve sleeve being movable between a first position wherein flow from said first fluid inlet to said first fluid port is permitted, and a second position wherein flow from said first fluid inlet to said first fluid port is blocked.

3. The supply failure protection valve of claim 2 wherein said second valve means includes a piston disposed inside said valve sleeve, said piston movable between a closed position wherein flow from said second fluid inlet to said first fluid port is blocked, and an open position wherein flow from said first fluid inlet to said second fluid port is permitted.

4. The supply failure protection valve of claim 3 further comprising first biasing means for urging said valve sleeve towards said first position.

5. The supply failure protection valve of claim 4 further comprising second biasing means for urging said piston towards said closed position.

6. The supply failure protection valve of claim 5 further comprising a first check valve disposed in said first fluid inlet, said first check valve allowing flow from said first fluid inlet to said bore but preventing flow in the opposite direction.

7. The supply failure protection valve of claim 6 further comprising a second check valve disposed in said second fluid port, said second check valve allowing flow from said bore to said second fluid port but preventing flow in the opposite direction.

8. A fluid supply failure protection valve, comprising:
 a housing having a bore with upper and lower portions formed therein;
 a cold fluid inlet for receiving a fluid at a first temperature;
 a hot fluid inlet for receiving a fluid at a second temperature greater than said first temperature, said hot fluid inlet having a hot fluid check valve disposed therein which allows flow from said hot fluid inlet to said bore but prevents flow in the opposite direction; a hot fluid port spaced-apart from said hot fluid inlet and connected in flow communication with said hot fluid inlet;
 a cold fluid port spaced-apart from said cold fluid inlet and connected in flow communication with said cold fluid inlet;
 a hollow sleeve disposed in said bore, said sleeve having open upper and lower ends, and a plurality of side ports formed through the lateral surfaces thereof, said side ports forming a transverse flow path through said sleeve, said sleeve movable between a first position which permits flow communication between said hot fluid inlet and said hot fluid port, and a second position in which flow communication between said hot fluid inlet and said hot fluid port is blocked;
 an upper biasing means disposed in said bore above said sleeve, so as to urge said sleeve towards said first position;
 a piston disposed in said sleeve, said piston movable between a closed position in which the flow of fluid from said cold fluid inlet to said hot fluid port is blocked and an open position in which flow communication is permitted from said cold fluid inlet to both of said hot and cold fluid ports;
 a lower biasing means disposed in said sleeve between said lower end of said sleeve and said lower face of said piston, said lower biasing means urging said piston towards said open position; wherein:
 said sleeve moves to said first position in the presence of fluid pressure in said cold fluid inlet, and moves to said second position in absence of fluid pressure in said cold fluid inlet; and
 said piston moves to said closed position in the presence of fluid pressure in said hot fluid inlet, and moves to said open position in response to the absence of fluid pressure in said hot fluid inlet.

9. The supply failure protection valve of claim 8 further comprising a cold fluid check valve disposed in said cold fluid port which allows flow from said bore to said cold fluid port but prevents flow in the opposite direction.

10. The supply failure protection valve of claim 8 wherein said piston has an upper face carrying an upper seal, a lower face carrying a lower seal, and a narrow central member connecting said upper and lower faces.

11. The supply failure protection valve of claim 10 wherein said upper biasing means includes a coil spring.

12. The supply failure protection valve of claim 10 wherein said upper biasing means comprises a surface area at said upper end of said sleeve which is greater than an opposing surface area at said lower end of said sleeve.

13. The supply failure protection valve of claim 10 wherein said lower biasing means includes a coil spring.

14. The supply failure protection valve of claim 8 further comprising a bypass passage providing flow communication between said hot fluid inlet upstream of said hot fluid check valve and said lower portion of said bore.

15. The valve assembly of claim 13 further comprising a bypass passage providing flow communication between said hot fluid inlet upstream of said check valve and said lower portion of said second bore.

* * * * *